United States Patent [19]
Srey et al.

[11] Patent Number: 6,141,436
[45] Date of Patent: Oct. 31, 2000

[54] PORTABLE COMMUNICATION DEVICE HAVING A FINGERPRINT IDENTIFICATION SYSTEM

[75] Inventors: Lena Srey, Chicago; Mark William Podl, Bartlett; Kevin D. Kaschke, Hoffman Estates, all of Ill.

[73] Assignee: Motorola, Inc., Schaumburg, Ill.

[21] Appl. No.: 09/047,773

[22] Filed: Mar. 25, 1998

[51] Int. Cl.$^7$ ............................... G06K 9/00; G07D 7/00
[52] U.S. Cl. ...................................... 382/124; 340/825.34
[58] Field of Search .................................. 382/124, 125, 382/127; 380/23, 30; 340/825.34, 825.69, 825.72; 348/552

[56] References Cited

U.S. PATENT DOCUMENTS

| | | | |
|---|---|---|---|
| 4,099,033 | 7/1978 | Murray | 179/90 |
| 4,358,640 | 11/1982 | Murray | 179/90 |
| 4,577,345 | 3/1986 | Abramov | 382/124 |
| 5,591,949 | 1/1997 | Bernstein | 235/380 |
| 5,838,306 | 11/1998 | O'Connor et al. | 382/124 |
| 5,870,672 | 2/1999 | Stoddard et al. | 455/410 |

FOREIGN PATENT DOCUMENTS

| | | | |
|---|---|---|---|
| 5-095329 | 4/1993 | Japan | H04B 7/26 |

OTHER PUBLICATIONS

StarTAC™90 Wearable Cellular Telephone User Manual, 1995, Motorola, Pan American Cellular Subscriber Group, 600 North U.S. Highway 45, Libertyville, Illinois 60048, pp. 2, 3 and 84–99.

*Primary Examiner*—Jose L. Couso
*Assistant Examiner*—Shawn B. Cage
*Attorney, Agent, or Firm*—Kevin D. Kaschke; Paul J. Bartusiak

[57] ABSTRACT

A portable communication device (100, 300, 400, 500) comprises a fingerprint identification system (709) including a scanner (115) for scanning a fingerprint (123) of a finger (121) to generate an image of the fingerprint (123). In a first embodiment, the scanner (115) is positioned relative to a switch (201) on the device (100, 300, 400, 500) to permit the finger (121) to generate the actuation force for the switch (201) when the fingerprint (123) is positioned on the scanner (115). In a second embodiment, the scanner (115) is ergonomically positioned on a housing (113, 117, 119) of the device (100, 300, 400, 500) where the finger (121) or a thumb naturally rests on the housing (113, 117, 119) when the person holds the housing (113, 117, 119) while the device (100, 300, 400, 500) is in use. In a third embodiment, a transmitter (205) of the device (100, 300, 400, 500) transmits data representative of the image of the fingerprint (123) to a remote site (715) when data representative of the image of the fingerprint (123) does not match data representative of a reference fingerprint.

5 Claims, 7 Drawing Sheets

PORTABLE COMMUNICATION DEVICE HAVING A FINGERPRINT IDENTIFICATION SYSTEM

FIELD OF THE INVENTION

The present invention generally relates to portable communication devices and more particularly to a portable communication device having a fingerprint identification system.

BACKGROUND OF THE INVENTION

Portable communication devices, such as cellular telephones, are well known in the art and permit a user to communicate with a remote site. Typically, a user pays a fee to a communications service provider for access to a communication system in which the portable communication device operates. Cellular telephones, in particular, have become so popular that thieves have found it profitable to steal these devices for their own use or for sale to another user.

To discourage the thieves and to generally provide electronic security, most cellular telephones permit a user to enter a code to electronically lock and/or unlock a cellular telephone. Electronically locking a cellular telephone prohibits the cellular telephone from being used, such as to make or receive telephone calls and/or to enable or disable particular features of the cellular telephone. Electronically unlocking a cellular telephone permits the cellular telephone to be used, such as to make or receive telephone calls and/or to enable or disable particular features of the cellular telephone.

Several known techniques for generating an electronic lock code include: pressing a key on a keypad of the cellular telephone labeled "LOCK," pressing a key on a keypad of the cellular telephone labeled "FCN" (i.e. function) followed by pressing another key on the keypad of the cellular telephone labeled "5," for example, pressing a predetermined sequence of numerically labeled keys on a keypad of the cellular telephone, such as for example, by pressing the keys "5," "3," and "8," and selecting a lock feature from a menu presented in an electronic display.

One known technique for generating an electronic unlock code include: pressing a predetermined sequence of numerically labeled keys on a keypad of the cellular telephone, such as for example, by pressing the keys "5," "3," and "8." The predetermined sequence of numerically labeled keys may be the same or different for electronically locking and unlocking a cellular telephone.

Disadvantages using keys on a keypad of the cellular telephone to generate an electronic lock or an unlock code include: the electronic unlock and lock code may be used by someone other than the authorized user, if the electronic unlock and lock code is known to the unauthorized user; needing to press the predetermined number of keys; needing to remember the electronic unlock and lock code; needing to conceal the pressing of the predetermined number of keys at appropriate times; needing to generate the electronic unlock and lock code before and after, respectively, the cellular telephone is used, such as to make or receive telephone calls and/or to enable or disable particular features of the cellular telephone; and needing to press one key to power on the cellular phone followed by the predetermined number of keys to generate an electronic lock or an unlock code.

Outside of the art of portable communication devices, such as cellular telephones, fingerprint identification systems are known in the art as exemplified by U.S. Pat. Nos. 5,473,144, 5,493,621, 5,546,471, 5,426,708, 5,465,303, 5,467,403, and 5,493,621 and by a fingerprint verifier available from VLSI Vision Limited, 18805 Cox Avenue, Suite 260, Saratoga, Calif. 95070, USA. Fingerprint identification systems typically comprise a fingerprint scanner for scanning a fingerprint, a read only memory (ROM) lookup table for storing data representative of an authorized user's fingerprint, a digital signal processor (DSP) having an algorithm for comparing the scanned fingerprint with the data representing an authorized user's fingerprint. A fingerprint identification system advantageously provides unique personal user identification. However, fingerprint identification system have not been applied to portable communication devices.

Accordingly, there is a need for a portable communication device having a fingerprint identification system.

DETAILED DESCRIPTION OF THE PREFERRED EMBODIMENTS

Figure 1:
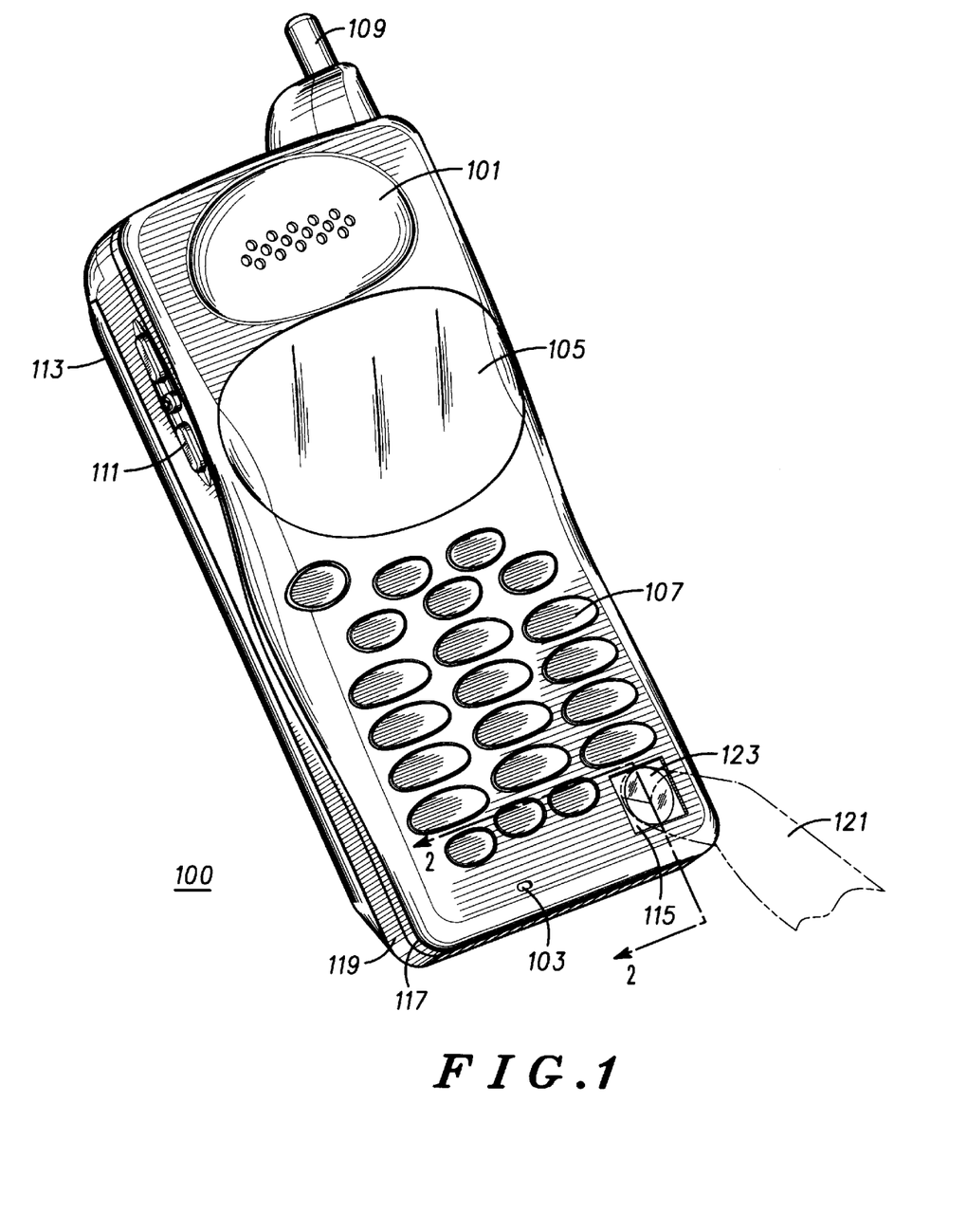
FIG. 1 illustrates a perspective view of a portable communication device in accordance with a first embodiment the present invention.
Figure 2:
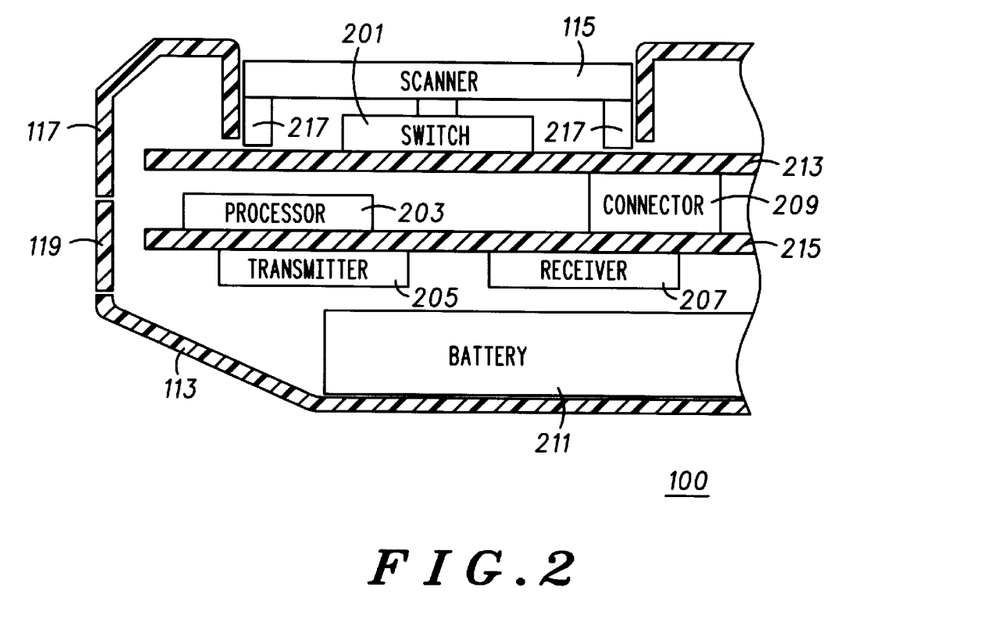
FIG. 2 illustrates a cross-sectional view of a portion of a portable communication device of FIG. 1 in accordance with the first embodiment the present invention.

In FIGS. 1–7, like reference numbers represent the same element for feature. FIG. 1 illustrates a perspective view of a portable communication device 100 in accordance with a first embodiment the present invention. FIG. 2 illustrates a cross-sectional view of a portion of a portable communication device 100 of FIG. 1 in accordance with the first embodiment the present invention. The portable communication device 100 generally includes an earpiece transducer 101, a microphone transducer 103, a display 105, a keypad 107, an antenna 109, a volume switch 111, a battery housing 113, a fingerprint identification system 709 (see FIG. 7) including a scanner 115, a front housing 117 and a rear housing 119. The design of portable communication device 100 including all of the elements mentioned hereinabove, with the exception of the fingerprint identification system 709 including a scanner 115, is well known in the art and is shown in U.S. Pat. No. Des. 384,952. The circuitry for the portable communication device 100 will be discussed herein below with reference to FIG. 7.

The portable communication device 100 advantageously uses the fingerprint identification system 709 including the scanner 115 as a substitute for the combination key press sequence of the prior art to generate a lock code and/or an unlock code for the portable communication device 100. The fingerprint identification system advantageously provides unique personal identification characteristic of a person's fingerprint; whereas, the combination key press sequence of the prior art provides a unique key press sequence. Disadvantages of the combination key press sequence of the prior art to generate a lock code and/or an unlock code include: the electronic unlock and lock code may be used by someone other than the authorized user, if the electronic unlock and lock code is known to the unauthorized user; needing to press the predetermined number of keys; needing to remember the electronic unlock and lock code; needing to conceal the pressing of the predetermined number of keys at appropriate times; needing to generate the electronic unlock and lock code before and after, respectively, the cellular telephone is used, such as to make or receive telephone calls and/or to enable or disable particular features of the cellular telephone; and needing to press one key to power on the cellular phone followed by the predetermined number of keys to generate an electronic lock or an unlock code. However, the fingerprint identification system only recognizes unique personal fingerprints of a person to provide increased security against fraudulent use of the portable communication device 100. Therefore, the person no longer need to remember the electronic unlock and lock code; to conceal the pressing of the predetermined number of keys at appropriate times; to generate the electronic unlock and lock code before and after, respectively, the cellular telephone is used, such as to make or receive telephone calls and/or to enable or disable particular features of the cellular telephone; and to press one key to power on the cellular phone followed by the predetermined number of keys to generate an electronic lock or an unlock code. The person simply places their finger on the scanner 115 to permit the scanner to scan their fingerprint.

The portable communication device 100 is preferably a cellular radiotelephone. However, the portable communication device may also be a selective call receiver, such as a pager, a personal notebook, a personal computer, a personal organizer, a data terminal, a two-way radio, an internet access device, an email access device, or the like.

The fingerprint identification system 709, alone, is well known in the art as is taught by U.S. Pat. Nos. 5,473,144, 5,493,621, 5,546,471, 5,426,708, 5,465,303, 5,467,403, and 5,493,621 and by a fingerprint verifier available from VLSI Vision Limited, 18805 Cox Avenue, Suite 260, Saratoga, Calif. 95070, USA. The fingerprint identification system typically comprise a fingerprint scanner 115 for scanning a fingerprint, a read only memory (ROM) lookup table for storing data representative of an authorized user's fingerprint, a digital signal processor (DSP) having an algorithm for comparing the scanned fingerprint with the data representing an authorized user's fingerprint. These elements will be discussed in further detail with reference to FIG. 7 hereinbelow.

In the first embodiment, a portable communication device 100 comprises a switch 201 (see FIG. 2), circuitry 700 (see FIG. 7) and a fingerprint identification system 709. The switch 201 generates an input signal 711 responsive to an actuation force. The circuitry 700 is adapted to receive the input signal 711. The fingerprint identification system 709 includes the scanner 115 for scanning a fingerprint 123 of a finger 121 to generate an image of the fingerprint 123. The scanner 115 is positioned relative to the switch 201 such that the finger 121 is permitted to generate the actuation force for the switch 201 when the fingerprint 123 is positioned on the scanner 115. Therefore, the operation of the scanner 115 and the operation of the switch 201 are advantageously integrated or combined to provide more efficient use of each operation, thereby simplifying the use of the portable communication device 100.

Referring to FIG. 2, the switch 201 is disposed underneath the scanner 115 to permit the scanner 115 to directly actuate the switch 201 when the finger 121 pressed down on the scanner 115. The switch 201 is mounted on a printed circuit board 213 as well as the keypad circuitry for the keypad 107. Alternatively, the switch 201 may be positioned at a location offset from the scanner and not disposed beneath the scanner 115. In this case, a mechanism would be needed to transfer the actuation force applied to the scanner 115 to the switch 201. Further, the switch may be actuated by a sliding motion instead of a pressing motion. In this case, the finger 121 would slide the scanner to actuate the switch 201 while the finger 121 is on the scanner 115 instead of pressing the scanner 115.

Preferably, the switch is a microswitch sensitive to the movement of the scanner 115. The microswitch may be implemented as a pushbutton switch or a slide switch. Alternatively, the switch may be an elastomeric switch integrated with the keypad or a touchscreen pad. The elastomeric switch is preferably implemented as a pushbutton switch, as is well known in the art. The touchscreen pad is preferably a transparent pad located on top of a scanning surface of the scanner. Therefore, the touchscreen pad is disposed on top of the scanner as opposed to below or offset to the side of the scanner 115, as discussed hereinabove.

FIG. 2 also shows posts 217 disposed between the scanner and a keypad printed circuit board 213 to prevent excessive force by a finger from damaging the switch 201. The posts 217 are preferably connected to the scanner 115. Alternatively, the posts may be connected to the keypad printed circuit board 213, to the switch 201, or be connected to or integrated with a separate piece, such as the front housing 117 or an elastomeric keypad of the keypad 107.

Preferably, the scanner 115 scans the fingerprint 123 at the same time as the switch 201 is actuated by the actuation force exerted by the finger 121. Alternatively, the scanning may be performed before or after the actuation of the switch. Preferably, the scanning and switch actuation to generate the input signal 711 happens in a relatively short period of time, such as one to two seconds, so that the user perceives the portable communication device 100 as simple and convenient to use.

Also shown in FIG. 2 are a cross-sectional view of the front housing 117, the rear housing 119, the battery housing 113, the keypad printed circuit board 213, a circuitry printed circuit board 215, the circuitry 700 including a processor 203, a transmitter 205, a receiver 207 and a connector 209, and a battery. The switch 201 is preferably mounted on the keypad printed circuit board 213. The processor 203, the transmitter 205 and the receiver 207 are preferably mounted on the circuitry printed circuit board 215. The connector 209 connects the switch 201 on the keypad printed circuit board 213 to the circuitry 700 on the circuitry printed circuit board 215. Alternatively, the switch 201, the processor 203, the transmitter 205 and the receiver 207 may be mounted on a single printed circuit board to eliminate one printed circuit board and the connector 209.

Figure 7:
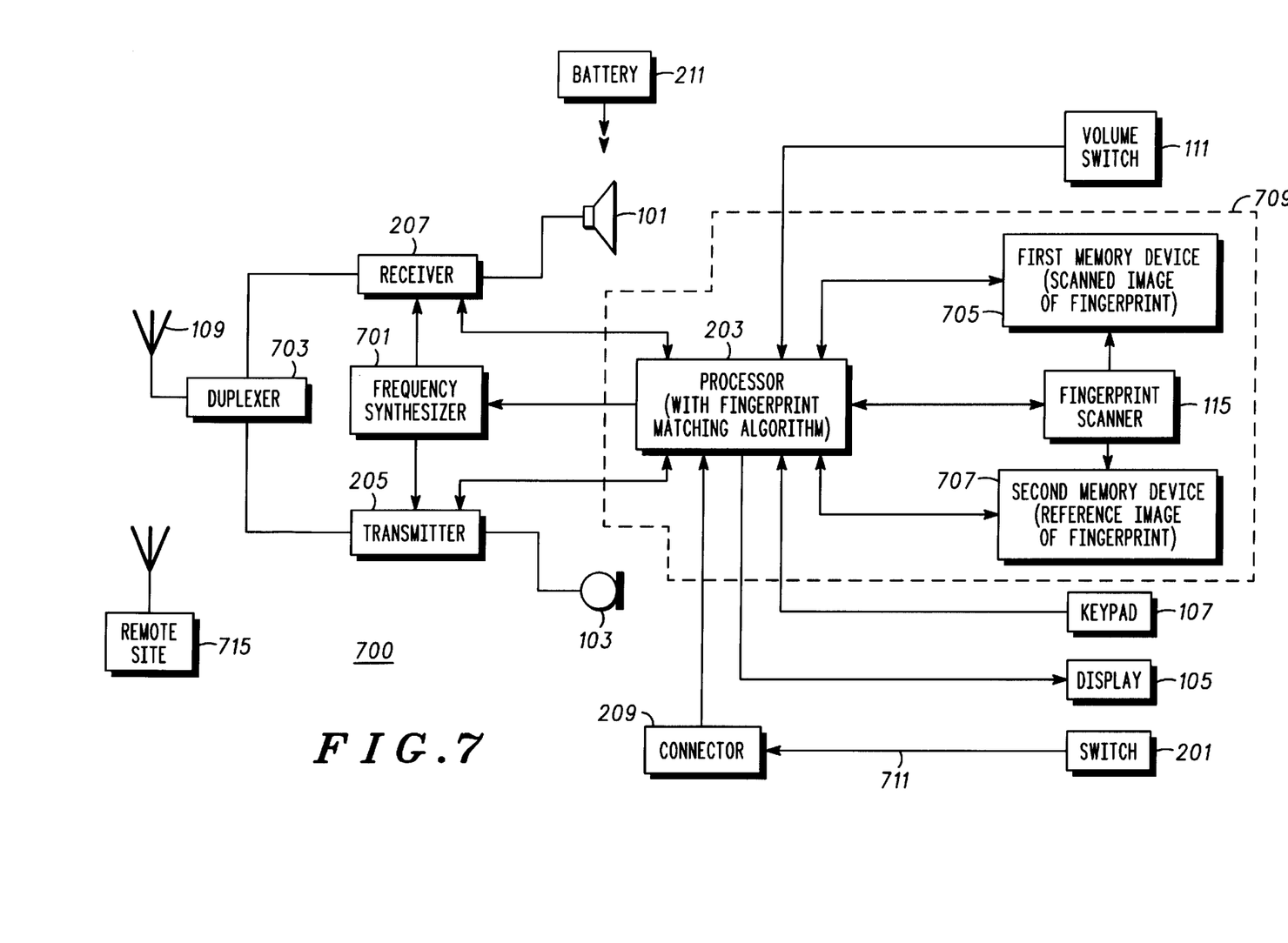
FIG. 7 illustrates an electrical block diagram a portable communication device in accordance with the first, the second and the third embodiments the present invention.

Referring briefly to FIG. 7, the fingerprint identification system 709 further comprises a first memory device 705, a second memory device 707 and the processor 203 (also shown in FIG. 2). The first memory device 705 stores data representative of the image of the fingerprint 123. The second memory device 707 stores data representative of at least one reference fingerprint. The processor 203 determines whether the data representative of the image of the fingerprint 123 matches the data representative of the at least one reference fingerprint. The processor 203 places the circuitry 700 in a first mode responsive to the input signal 711 when the data representative of the image of the fingerprint 123 matches the data representative of the at least one fingerprint.

The first memory device 705 is preferably a random access memory (RAM), as is well known in the art. The second memory device 707 is preferably a read only memory (ROM), as is well known in the art. The processor 203 is preferably a digital signal processor, as is well known in the art. The processor 203 has contained therein a matching algorithm embodied in software or hardware to determine whether the data representative of the image of the fingerprint 123 matches the data representative of the at least one reference fingerprint, as is well known in the art.

Preferably, the processor 203 places the circuitry 700 in a second mode responsive to the input signal 711 when the data representative of the image of the fingerprint 123 does not match the data representative of the at least one reference fingerprint.

Preferably, the switch 201 is a power switch and the input signal 711 is a power on/off signal. In this case, first mode and the second mode preferably comprise the circuitry 700 being turned on and the circuitry 700 being prevented from being turned on, respectively. Alternatively, the first mode and the second mode may comprise the circuitry 700 being turned on and the circuitry 700 temporarily being turned on to transmit the data representative of the image of the fingerprint to a remote site then the circuitry 700 being turned off, respectively. This alternative will be discussed in further detail with reference to FIG. 6.

Alternatively, the switch 201 is a data switch and the input signal is a data signal. In this case, the first mode and the second mode further comprise an operational mode of the circuitry 700 being enabled and the operational mode of the circuitry 700 being disabled, respectively. Preferably, the operational mode of the circuitry 700 further comprises an incoming signal responding mode, such as answering an incoming telephone call by pressing a "SEND" key on a cellular telephone. Alternatively, in this case the operational mode of the circuitry 700 may comprises a customized feature setting mode, wherein the person is permitted to change operational features or options of the portable communication device 100.

Note that any of the features of the first embodiment may be used individually or in combination to achieve various mechanical structures, electrical structures and methods of operation of the portable communication device 100.

In summary of one aspect of the first embodiment, the portable communication device 100 comprises the power switch 201, the circuitry 700 and the fingerprint identification system 709. The power switch 201 generates a power on/off signal 711 responsive to an actuation force. The circuitry 700 is adapted to receive the power on/off signal 711. The fingerprint identification system 709 comprises the scanner 115, the first memory device 705, the second memory device 707 and the processor 203. The scanner 115 scans the fingerprint 123 of the finger 121 to generate the image of the fingerprint. The scanner 115 is positioned relative to the power switch 201 such that the finger 121 is permitted to generate the actuation force for the power switch 201 when the fingerprint 123 is positioned on the scanner 115. The first memory device 705 stores data representative of the image of the fingerprint 123. The second memory device 707 stores data representative of at least one reference fingerprint. The processor 203 determines whether the data representative of the image of the fingerprint 123 matches the data representative of the at least one fingerprint. The processor 203 places the circuitry 700 in a first mode responsive to the power on/off signal 711 when the data representative of the image of the fingerprint 123 matches the data representative of the at least one reference fingerprint. Further, the processor 203 places the circuitry 700 in a second mode responsive to the power on/off signal 711 when the data representative of the image of the fingerprint 123 does not match the data representative of the at least one fingerprint. Details of the first and second modes are discussed hereinabove.

In summary of a second aspect of the first embodiment, the portable communication device 100 comprises the data switch 201, the circuitry 700 and the fingerprint identification system 709. The data switch 201 generates an data signal 711 responsive to an actuation force. The circuitry 700 is adapted to receive the data signal 711. The fingerprint identification system 709 comprises the scanner 115, the first memory device 705, the second memory device 707 and the processor 203. The scanner 115 scans the fingerprint 123 of the finger 121 to generate an image of the fingerprint 123. The scanner 115 is positioned relative to the data switch 201 such that the finger 121 is permitted to generate the actuation force for the data switch 201 when the fingerprint 123 is positioned on the scanner 115. The first memory device 705 stores data representative of the image of the fingerprint 123. The second memory device 707 stores data representative of at least one reference fingerprint. The processor 203 determines whether the data representative of the image of the fingerprint 123 matches the data representative of the at least one reference fingerprint. The processor 203 places the circuitry 700 in a first mode responsive to the data signal 711 when the data representative of the image of the fingerprint 123 matches the data representative of the at least one fingerprint. Further, the processor 203 places the circuitry 700 in a second mode responsive to the data signal 711 when the data representative of the image of the fingerprint 123 does not match the data representative of the at least one fingerprint. Details of the first and second modes are discussed hereinabove.

Figure 3:
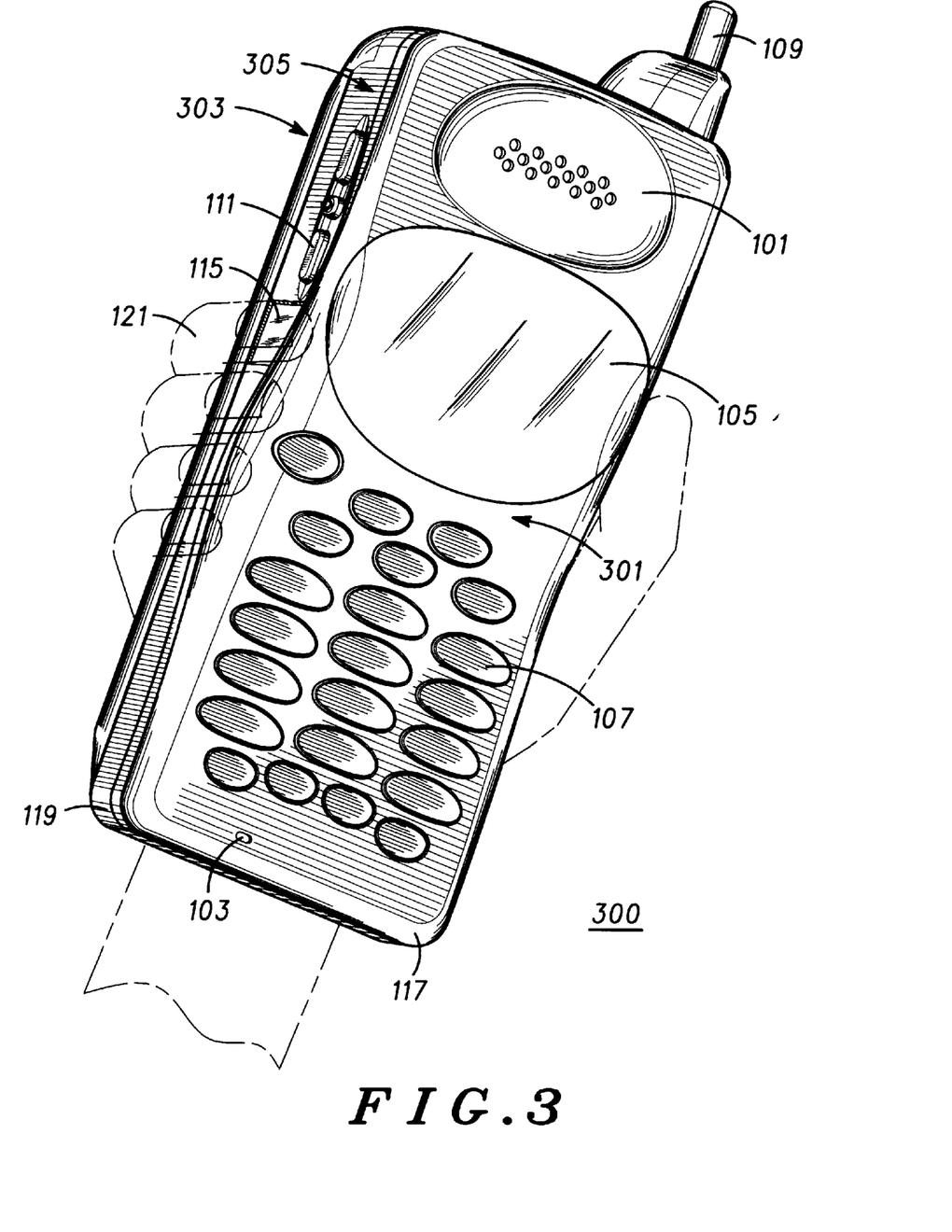
FIG. 3 illustrates a perspective view of a portable communication device in accordance with a first aspect of a second embodiment the present invention.
Figure 4:
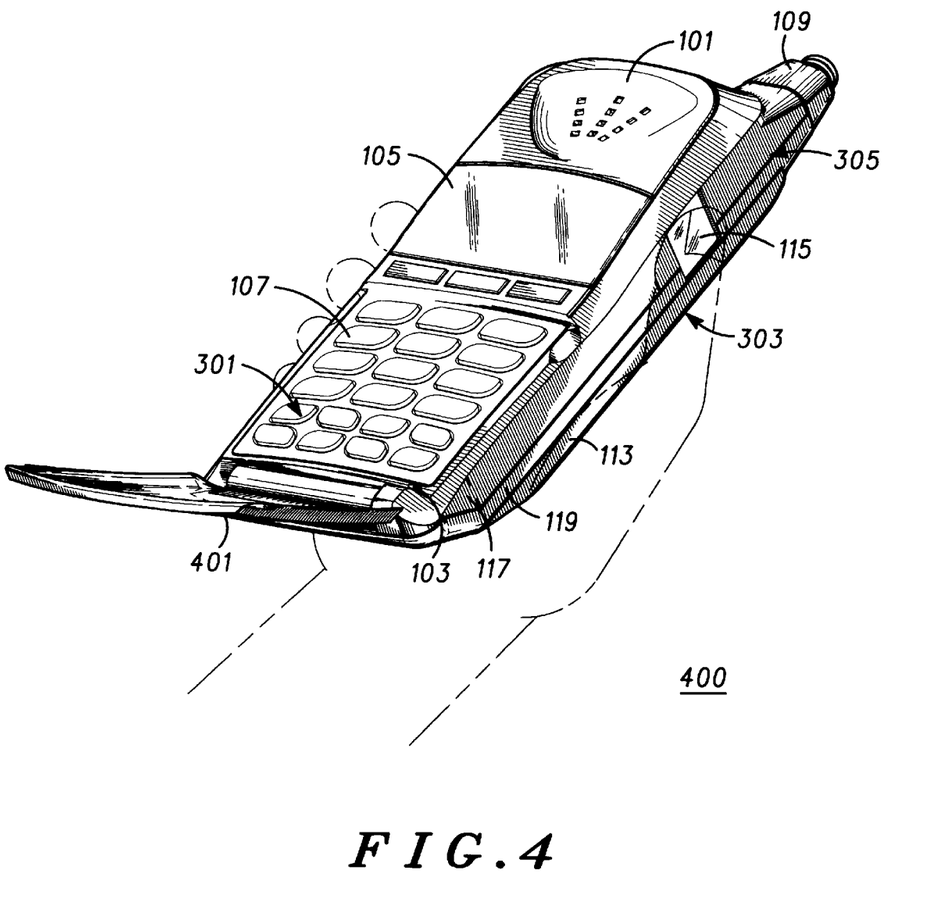
FIG. 4 illustrates a perspective view of a portable communication device in accordance with a second aspect of a second embodiment the present invention.
Figure 5:
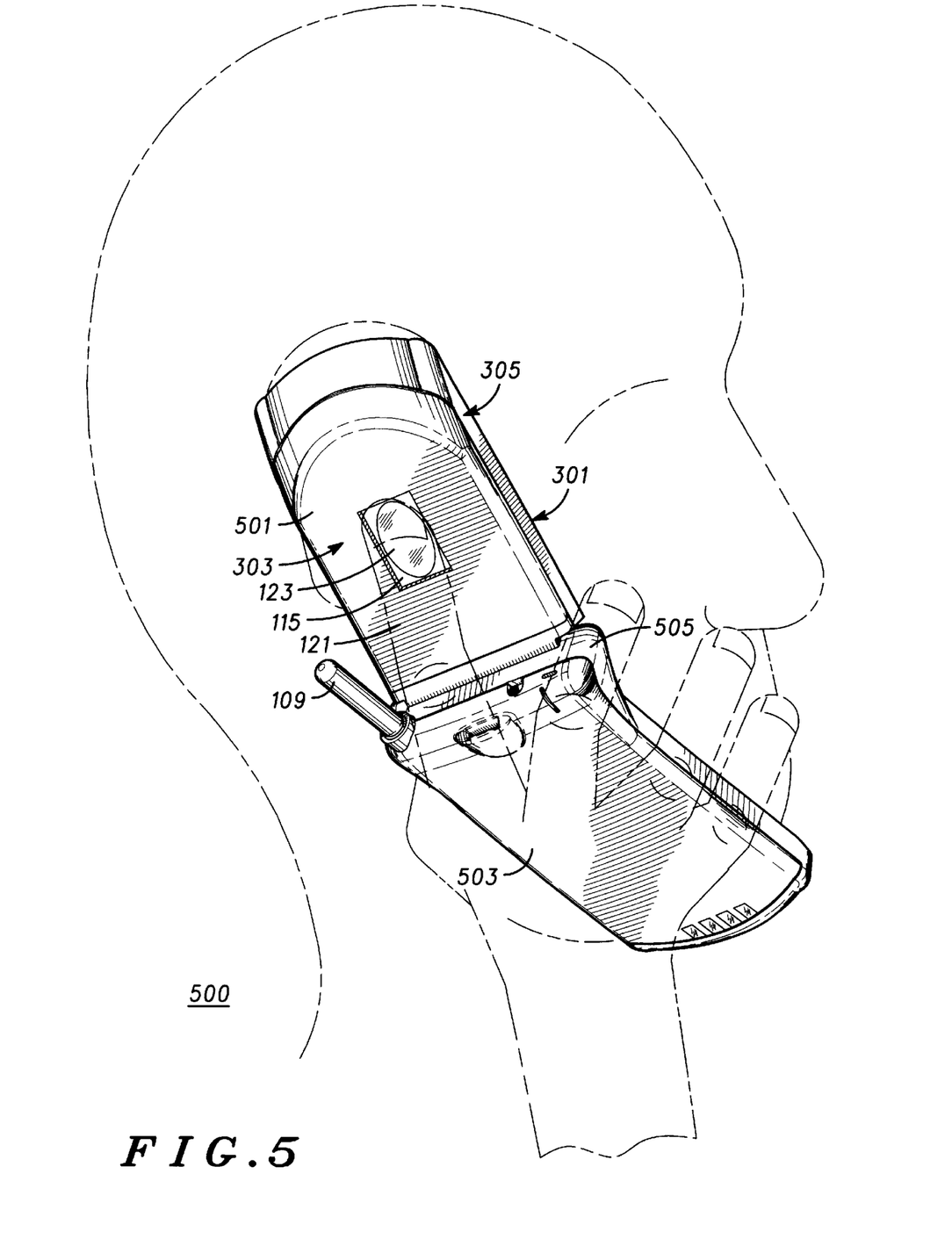
FIG. 5 illustrates a perspective view of a portable communication device in accordance with a third aspect of a second embodiment the present invention.

Turning now to FIGS. 3, 4 and 5, as second embodiment of the present invention is presented. FIG. 3 illustrates a perspective view of a portable communication device 300 in accordance with a first aspect of a second embodiment the present invention. FIG. 4 illustrates a perspective view of a portable communication device 400 in accordance with a second aspect of the second embodiment the present invention. FIG. 5 illustrates a perspective view of a portable communication device 500 in accordance with a third aspect of the second embodiment the present invention.

In accordance with the second embodiment, the portable communication device 300, 400 or 500 comprises circuitry 700 (see FIG. 7), a housing 117 and 119 and the fingerprint identification system 709 (see FIG. 7). The housing 113, 117 and 119 carries the circuitry 700. The housing 117 and 119 is adapted to be held by a hand, having fingers and a thumb, of a person. The fingerprint identification system 709 includes the scanner 115 for scanning an image of the fingerprint 123 of the finger 121 or the thumb of the hand. The scanner 115 is ergonomically positioned on the housing 113, 117 and 119 where the finger 121 or thumb naturally rests on the housing 113, 117 and 119 when the person holds the housing 113, 117 and 119 while the portable communication device 300, 400 or 500 is in use. The second embodiment advantageously permits a person to grab and hold the portable communication device 300, 400 or 500 in a natural way and at the same time use the scanner 115. The ergonomic position of the scanner 115 advantageously saves the person time in operating the portable communication device 300, 400 or 500 by placing the scanner 115 in a location that the person can easily reach while holding the portable communication device 300, 400 or 500. The ergonomic position of the scanner 115 advantageously also permits the person to use the portable communication device 300, 400 or 500 and the scanner 115 carried thereon with one hand, thereby permitting the person to use their other hand for other things.

Preferably, the housing 113, 117 and 119 has a front surface 301 disposed opposite a rear surface 303 and a side surface 305 disposed between the front surface 301 and the rear surface 303. The front surface 301 typically has a user interface including the earpiece transducer 101, the microphone transducer 103, the display 105 and the keypad 107. The rear surface 303 of the housing 113, 117 and 119 typically encloses the battery 211 (see FIG. 2). Alternatively, the housing 113, 117 and 119 may be constructed as a single housing. Further, the battery may cover only a portion of the rear surface of the battery housing 119. In this case, the scanner 115 is located on the rear surface of the rear housing 119 and not on the battery housing 113 to avoid the need for connecting the scanner 115 to the circuitry 700 through the battery housing 113.

According to a first aspect of the second embodiment, the scanner 115 is ergonomically positioned on the side surface 305 of the housing 113, 117 and 119, as shown in FIGS. 3 and 4. In FIG. 3, the scanner 115 is positioned on a left side of the housing 113, 117 and 119 to permit the finger of a person's right hand to be positioned on the scanner 115 when the portable communication device 300 is held by the person's right hand during use. The design of the housing 113, 117 and 119 shown in FIG. 3, with the exception of the scanner 115 and the location thereof, is shown in U.S. Pat. No. Des. 384,952. In FIG. 4, the scanner 115 is positioned on a right side of the housing 113, 117 and 119 to permit the thumb of a person's right hand to be positioned on the scanner 115 when the portable communication device 300 is held by the person's right hand during use. Note in FIG. 4, that a flap housing 401 is rotatably connected to the housing 117 and 119, to permit the flap housing 401 to rotate between an open position exposing the keypad 107 (shown in FIG. 4) and a closed position covering the keypad 107 (not shown). The design of the housing 113, 117 and 119 shown in FIG. 4, with the exception of the scanner 115 and the location thereof, is shown in U.S. Pat. No. Des. 379,982.

According to a second aspect of the second embodiment, the scanner 115 is ergonomically positioned on the rear surface 303 of the housing 113, 117 and 119, as shown in FIG. 5. As mentioned hereinabove, the scanner 115 may be positioned on the rear surface of the rear housing 119 or the rear surface of the battery housing 113. Note in FIG. 5 that the housing 113, 117 and 119 is comprised of a top housing 501 rotatably coupled to a bottom housing 503 about a hinge 505 between an open position (shown in FIG. 5) and a closed position (not shown). Alternatively, a slide mechanism may connect the top housing 501 to the bottom housing 503.

Note that the ergonomic locations of the scanner as depicted on the portable communication devices 300, 400 and 500 may be implemented on any of the housing constructions as shown in FIGS. 3, 4 and 5. For example, the scanner 115 may be located on the side surface 305 of the top housing 501 in FIG. 5 or the scanner 115 may be located on the right side surface of the housing 113, 117, and 119 in FIG. 4.

In accordance with the second embodiment, the fingerprint identification system 709 further comprises the first memory device 705, the second memory device 707 and the processor 203. The first memory device 705 stores data representative of the image of the fingerprint 123. The second memory device 707 stores data representative of at least one reference fingerprint. The processor 203 determines whether the data representative of the image of the fingerprint 123 matches the data representative of the at least one reference fingerprint. The processor 203 places the circuitry 700 in a first mode responsive to the input signal 711 when the data representative of the image of the fingerprint 123 matches the data representative of the at least one reference fingerprint. Preferably, the processor 203 permits the circuitry 700 to operate in the first mode as long as the finger 121 or thumb remains on the scanner 115. Preferably, the scanner 115 scans the fingerprint to detect an authorized user only once, then periodically checks for the presence of the fingerprint without engaging the matching algorithm in the processor 203.

Preferably, the circuitry 700 includes a transmitter 205 coupled to a microphone transducer 103 and a receiver 207 coupled to an earpiece transducer 101, as shown in FIG. 7. The housing 113, 117 and 119 is adapted to be held by the hand of the person against a head of the person to permit the person to listen to acoustic signals generated by the earpiece transducer 101 and to generate acoustic signals for input into the microphone transducer 103 while the portable communication device 300, 400 and 500 is in use. When the portable communication device 300, 400 and 500 is held in this position, the scanner 115 is located in advantageous locations as described hereinabove.

Figure 6:
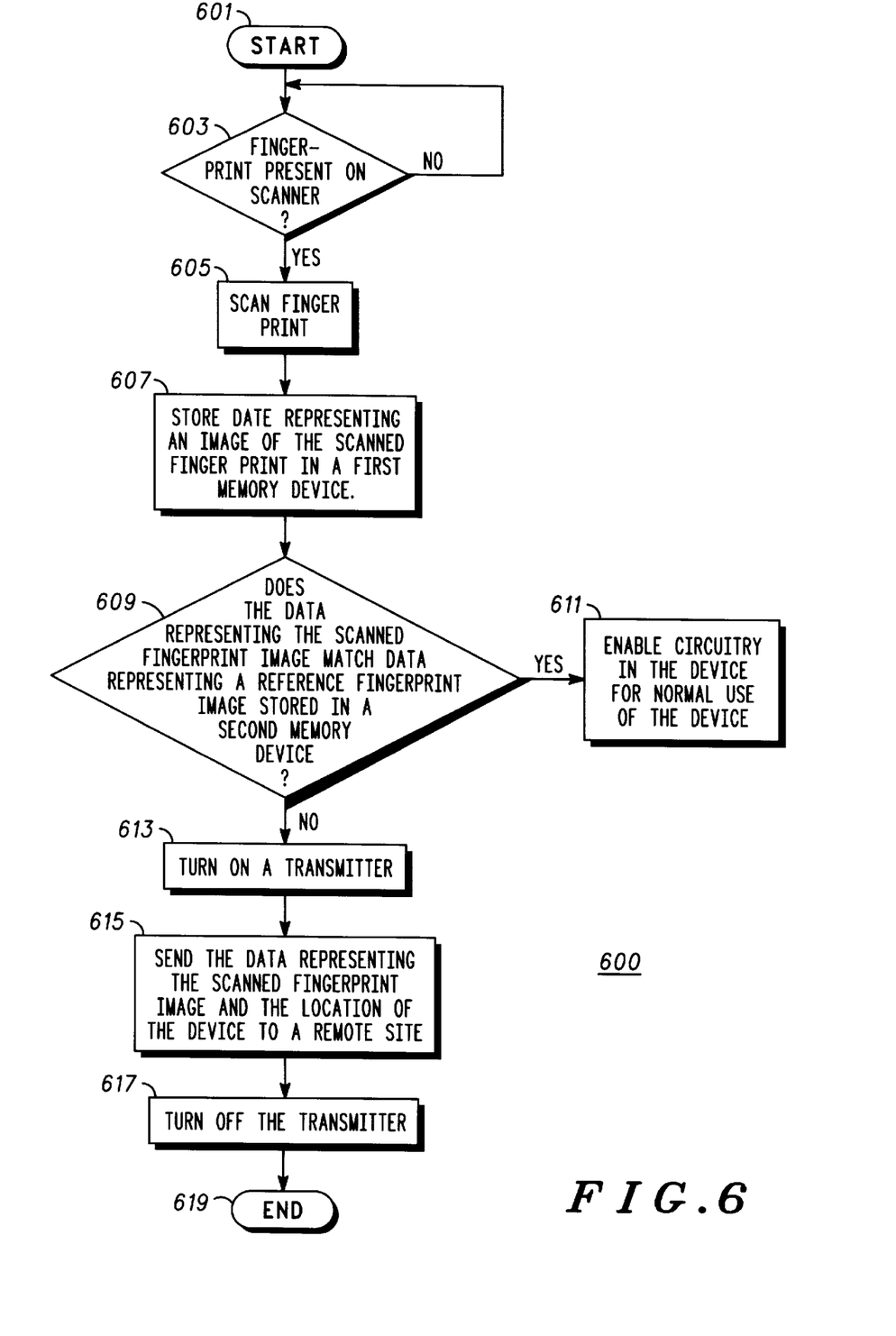
FIG. 6 illustrates a flowchart describing a method performed by a portable communication device in accordance with a third embodiment the present invention.

FIG. 6 illustrates a flowchart describing a method performed by a portable communication device 100, 200, 300, 400, or 500 in accordance with a third embodiment the present invention. In summary of the third embodiment, the portable communication device 100, 200, 300, 400, or 500 comprises circuitry 700 including the transmitter 205 (see FIG. 7) and the fingerprint identification system 709 (see FIG. 7). The fingerprint identification system 709 comprises the scanner 115, the first memory device 705, the second memory device 707 and the processor 203. The scanner 115 scans the fingerprint 123 of the finger 121 to generate an image of the fingerprint 123. The first memory device 705 stores data representative of the image of the fingerprint 123. The second memory device 707 stores data representative of at least one reference fingerprint. The processor 203 determines whether the data representative of the image of the fingerprint 123 matches the data representative of the at least one reference fingerprint. The processor 203 causes the transmitter 205 to transmit the data representative of the image of the fingerprint 123 to a remote site 715 (see FIG. 7) when the data representative of the image of the fingerprint 123 does not match the data representative of the at least one fingerprint.

According to FIG. 6, the flowchart starts at block 601. The flow continues to block 603 wherein a determination is made whether or not a fingerprint is present on the scanner 115. If not, the flow returns to block 603 to check again. If a fingerprint is present on the scanner 115, the flow continues to block 605, wherein the scanner 115 scans an image of the fingerprint 123. The flow continues to block 607, wherein data representing the image of the scanned fingerprint 123 is stored in a first memory device 705. The flow continues to block 609 wherein the processor determines whether or not the data representing the image of the scanned fingerprint 123 matches data representing an image of at least one reference fingerprint stored in a second memory device 707. If the determination at block 609 is positive, then the flow continues to block 611, wherein the circuitry 700 is enabled to permit normal operation of the portable communication device 100, 300, 400, and 500. If the determination at block 609 is negative, then the flow continues to block 613, wherein the transmitter 205 is turned on by the processor 203. The flow continues to block 615 wherein the data representing the image of the scanned fingerprint 123 and the location of the portable communication device 100, 300, 400, and 500 in the communication system is transmitted to a remote site 715, such as a cellular base station. The flow continues to block 617, wherein the processor 203 turns the transmitter 205 off responsive to the transmission. The flow ends at block 619.

The third embodiment advantageously provides increased security and fraud prevention and detection for the portable communication device 100, 300, 400, and 500. The data received by the remote site 715 would be kept in a memory which would be periodically overwritten by unauthorized fingerprint data sent from the portable communication device 100, 300, 400, and 500. Preferably, the memory at the remote site 715 would hold five to 10 unauthorized individual fingerprint data and locations of the device which are date stamped according to the date they were received. Then, if a person's device is stolen, the person reports the date that the device was stolen to the communication system provider. The provider would retrieve the unauthorized individual fingerprint data and locations of the device from the date the device was reported stolen. This data could then be used by a law enforcement agency to find the person who allegedly took the device without the authorized person's permission.

FIG. 7 illustrates an electrical block diagram a portable communication device in accordance with the first, the second and the third embodiments the present invention. FIG. 7 generally includes the earpiece transducer 101, the microphone transducer 103, the display, the keypad 107, the antenna 109, the volume switch 111, the processor 203, the transmitter 205, the receiver 207, a frequency synthesizer 701, a duplex filter 703, the switch 201, the connector 209, the battery 211 and the fingerprint identification system 709 including the first memory device 705, the scanner 115, the second memory device 707, and the processor 203. With the exception of the fingerprint identification system 709, the earpiece transducer 101, the microphone transducer 103, the display, the keypad 107, the antenna 109, the volume switch 111, the processor 203, the transmitter 205, the receiver 207, the frequency synthesizer 701, the duplex filter 703, the switch 201, the connector 209 and the battery 211 operate in a portable communication device, such as a cellular telephone, as is well known in the art. Further, only the fingerprint identification system 709 including the first memory device 705, the scanner 115, the second memory device 707, and the processor 203 operate as is well known in the art of fingerprint identification systems, outside the portable communication device art. The three embodiments discussed hereinabove describe unique combinations between the portable communication device and the fingerprint identification system 709 to provide advantages not present in either the portable communication device or the fingerprint identification system 709 alone.

Note that any of the features of the first, the second and the third embodiments may be combined in whole or in part to produce various mechanical structures, electrical structures and/or method of operation.

What is claimed is:

1. A cellular telephone comprising:

circuitry including:
a transmitter coupled to a microphone transducer, and
a receiver coupled to an earpiece transducer;

a housing for carrying the circuitry, the housing having a front surface disposed opposite a rear surface and a side surface disposed between the front surface and the rear surface, wherein the housing is adapted to be held by a hand, having fingers and a thumb, of a person against a head of the person to permit the person to listen to acoustic signals generated by the earpiece transducer in signal communication with the front surface and to generate acoustic signals for input into the microphone transducer in signal communication with the front surface while the cellular telephone is in use; and a fingerprint identification system including a scanner for scanning an image of a fingerprint of a finger or the thumb of the hand, wherein the scanner is ergonomically positioned on the housing on any of the rear surface of the housing and the side surface of the housing where the finger or thumb naturally rests on the housing when the person holds the housing while the cellular telephone is in use.

2. A cellular telephone according to claim 1 wherein the fingerprint identification system further comprises:

a first memory device for storing data representative of the image of the fingerprint;

a second memory device for storing data representative of at least one fingerprint; and a processor determining whether the data representative of the image of the fingerprint matches the data representative of the at least one fingerprint, wherein the processor places the circuitry in a first mode responsive to the input signal when the data representative of the image of the fingerprint matches the data representative of the at least one fingerprint.

3. A cellular telephone according to claim 2 wherein the processor permits the circuitry to operate in the first mode as long as the finger or thumb remains on the scanner.

4. A cellular telephone for sending and receiving information such as voice signals, the cellular telephone comprising:

a housing;

a transmitter carried by the housing, the transmitter for modulating and transmitting input information;

a receiver carried by the housing, the receiver for receiving and demodulating transmitted information;

a fingerprint identification security system carried by the housing, the fingerprint identification security system to detect authorized and unauthorized use of the cellular telephone, the fingerprint identification security system including:

a scanner for scanning a fingerprint of a finger to generate an image of the fingerprint, a first memory coupled to the scanner for storing the image of the fingerprint, a second memory coupled to the first memory for storing a reference fingerprint, and control circuitry coupled to the first memory and the second memory, the control circuitry for determining whether the image of the fingerprint matches the reference fingerprint, wherein when the image of the fingerprint matches the reference fingerprint, the control circuitry activates the cellular telephone for use, and when the image of the fingerprint does not match the reference fingerprint, the control circuitry causes the cellular telephone to temporarily transmit the image of the fingerprint to a remote site and then deactivate the cellular telephone from use.

5. The cellular telephone as in claim 4 wherein a transmission of the image of the fingerprint to the remote site includes information pertaining to any of a geographic location of the cellular telephone and a date of the transmission of the image.

* * * * *